(12) United States Patent
Nagasaka

(10) Patent No.: US 8,340,822 B2
(45) Date of Patent: Dec. 25, 2012

(54) ACTUATOR CONTROL DEVICE, ACTUATOR CONTROL METHOD, ACTUATOR, ROBOT APPARATUS, AND COMPUTER PROGRAM

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 793 days.

(21) Appl. No.: 12/432,292

(22) Filed: Apr. 29, 2009

(65) Prior Publication Data

US 2009/0272585 A1    Nov. 5, 2009

(30) Foreign Application Priority Data

May 1, 2008    (JP) ................... P2008-119508

(51) Int. Cl.
*G05B 15/00* (2006.01)
(52) U.S. Cl. ......... 700/260; 700/170; 700/245; 700/261
(58) Field of Classification Search .......... 700/170, 700/245, 260, 261; 901/1, 8, 19, 46
See application file for complete search history.

(56) References Cited

U.S. PATENT DOCUMENTS

| | | | | |
|---|---|---|---|---|
| 5,056,038 A * | 10/1991 | Kuno et al. | ................... | 700/260 |
| 5,587,937 A * | 12/1996 | Massie et al. | ..................... | 703/7 |
| 5,648,709 A * | 7/1997 | Maeda | ..................... | 318/568.17 |
| 6,865,446 B2 * | 3/2005 | Yokono et al. | ................ | 700/245 |
| 6,962,220 B2 * | 11/2005 | Takenaka et al. | ............. | 180/8.6 |
| 7,072,740 B2 * | 7/2006 | Iribe et al. | ..................... | 700/245 |
| 7,212,886 B2 * | 5/2007 | Nagata et al. | ................ | 700/245 |
| 7,260,450 B2 * | 8/2007 | Okazaki et al. | ............... | 700/254 |
| 7,657,345 B2 * | 2/2010 | Endo et al. | ..................... | 700/249 |
| 8,112,179 B2 * | 2/2012 | Nakajima | ..................... | 700/261 |
| 8,155,790 B2 * | 4/2012 | Oga et al. | ..................... | 700/261 |
| 2003/0004610 A1 * | 1/2003 | Niemeyer et al. | ............ | 700/245 |
| 2004/0128030 A1 * | 7/2004 | Nagata et al. | ............... | 700/245 |
| 2004/0176875 A1 * | 9/2004 | Iribe et al. | ..................... | 700/245 |
| 2005/0027397 A1 * | 2/2005 | Niemeyer | ..................... | 700/245 |
| 2005/0113973 A1 * | 5/2005 | Endo et al. | ..................... | 700/245 |
| 2006/0071625 A1 * | 4/2006 | Nakata et al. | ............ | 318/568.12 |
| 2006/0207419 A1 * | 9/2006 | Okazaki et al. | ................... | 91/35 |
| 2007/0021870 A1 * | 1/2007 | Nagasaka | ..................... | 700/245 |
| 2007/0118252 A1 * | 5/2007 | Okazaki et al. | ............... | 700/254 |
| 2007/0142968 A1 * | 6/2007 | Prisco et al. | .................. | 700/245 |
| 2009/0102620 A1 * | 4/2009 | Kato et al. | ................. | 340/407.1 |

(Continued)

FOREIGN PATENT DOCUMENTS

JP    08-52675    2/1996

(Continued)

*Primary Examiner* — Khoi Tran
*Assistant Examiner* — Jorge Peche
(74) *Attorney, Agent, or Firm* — Finnegan, Henderson, Farabow, Garrett & Dunner LLP

(57) ABSTRACT

There is provided an actuator control device for force-controlling a joint driving actuator according to a commanded joint force command value $\tau_a$. The actuator control device includes a joint value detecting means for detecting a joint value q at an output stage of the actuator, an action force detecting means for detecting an action force $\tau_e$ in a joint driving direction at the output stage of the actuator, and a driving force determining means for determining an instructed driving force $\tau$ to the actuator, on the basis of an ideal response model of the actuator which specifies the relationship of a joint value acceleration target value achieved as the actuator responds ideally when the joint force command value $\tau_a$, the action force $\tau_e$, and a joint value velocity obtained by time-differentiating the joint value q are given.

10 Claims, 13 Drawing Sheets

U.S. PATENT DOCUMENTS

| | | | |
|---|---|---|---|
| 2009/0105878 A1* | 4/2009 | Nagasaka | 700/245 |
| 2010/0234999 A1* | 9/2010 | Nakajima | 700/261 |

FOREIGN PATENT DOCUMENTS

| | | |
|---|---|---|
| JP | 08-323670 | 12/1996 |
| JP | 2000-246681 | 9/2000 |
| JP | 2001-105358 | 4/2001 |
| JP | 2005-61836 | 3/2005 |
| JP | 2005-102427 | 4/2005 |
| JP | 2005-151797 | 6/2005 |
| JP | 2006-178644 | 7/2006 |
| JP | 2007-108955 | 4/2007 |
| JP | 2007-124856 | 5/2007 |
| JP | 2008-030167 | 2/2008 |
| JP | 2009-95959 | 5/2009 |
| JP | 2009-288198 | 12/2009 |

* cited by examiner

ACTUATOR CONTROL DEVICE, ACTUATOR CONTROL METHOD, ACTUATOR, ROBOT APPARATUS, AND COMPUTER PROGRAM

BACKGROUND OF THE INVENTION

1. Field of the Invention

The present invention relates to an actuator control device and an actuator control method which control actuators used for driving or the like of joint parts of a robot, an actuator, a robot apparatus, and a computer program, and particularly, to an actuator control device and an actuator control method which control driving of joint actuators by a force control method which directly controls a joint generation force, an actuator, a robot apparatus, and a computer program.

More specifically, the present invention relates to an actuator control device and an actuator control method which perform force control suitable for physical interaction with a human being while coping with factors of disturbances whose modeling or identifying is difficult, such as friction or inertia, which exists in joint parts, an actuator, a robot apparatus, and a computer program, and particularly, to an actuator control device and an actuator control method which perform force control suitable for physical interaction with a human being while coping with a disturbance problem by calculating a joint force for generating a desired force in a predetermined part of a body while the dynamics of the robot is taken into consideration, an actuator, a robot apparatus, and a computer program.

2. Description of the Related Art

With economic development, the mechanism of a decrease in the birthrate or stabilization of young population to a low level, and a decrease in mortality below the middle age acts. As a result, the phenomenon in which elderly population increases relatively proceeds rapidly. Although the ratio of elderly people and productive-age population which supports the elderly people was 1 person:3.3 persons at the present time of 2005, it is expected that the ratio will be 1 person:2.4 persons in 2015, and 1 person:2.1 persons in 2025. In such an aging society, it is imperative to make the elderly people live as healthily and actively as possible without requiring nursing care, or to make a society in which aggravation can be prevented as much as possible even if the elderly people require nursing care, and they can lead independent lives.

Additionally, the need for mechatronics instruments aiming at assistance in elderly people's minds and bodies is increasing in elderly-people nursing care facilities or at homes which have elderly people.

For example, an odor emission source detecting and eliminating apparatus is suggested which can be utilized for immediately sanitary removal of excrement which may cause odors in elderly people nursing-care facilities, hospitals, etc., and cause hospital infections (for example, refer to JP-A-2005-61836). Additionally, an action expression system is suggested which makes the action of an elderly person expressed by a robot at a close relative's house on the basis of a first detection result obtained by detecting the action of the elderly person, estimates the degree of interest of the close relative from a second detection result obtained by detecting the watching action of the close relative, and feeds back the result to give a change to the action expression of the robot (for example, refer to JP-A-2006-178644).

In recent years, the need for mental assistance in which robots are effectively incorporated in occupational therapy as well as physical assistance called power assistance of autonomous walking aids or upper limbs is further increasing.

The mechatronics instruments to be applied in the field as described above should execute a task while making physical contact with people or complicated actual environments flexibly and safely. That is, unlike the fact that related-art industrial robots performed fixed motions under a known environment, the inventors consider that the above mechatronics instruments should sense an unknown environment and obtain a proper external force from surrounding environments which vary every moment, thereby properly adjusting the generation forces of actuators so that a desired task may be achieved.

Here, the robot is basically a multi-link structure including joints which are a plurality of links and link movable portions, and is adapted so as to drive each joint by using an actuator including a DC brushless motor or the like. Additionally, the method of controlling such a robot (or joint actuator which constitutes the robot) includes, for example, positional control and force control. The positional control is a control method of driving the joint so as to give a position command value, such as an angle, to the actuator and follow the command value. The other force control is a control method of directly receiving a target value of the force to be applied to an operation object and realizing the force indicated by the target value, and can directly control a joint generation force and directly control a force.

Most of related-art robot apparatuses are driven by positional control from simplicity on control, and easy construction of a system. However, the positional control is commonly called "hard control" because its basic purpose is to hold a position, and is not suitable for responding to an external force flexibly or for precisely performing "soft" control in terms of velocity or acceleration. For example, robot apparatuses which execute a task while performing physical interaction with various outsides originally have low compatibility with the positional control.

In contrast, in the force control it is considered that more flexible physical interaction service with a human being in terms of force becomes possible although a control law or a system configuration becomes complicated. On the other hand, the force control is apt to be influenced by a disturbance, and the control is not easy.

Friction or inertia which exists in a joint part becomes a biggest problem as a disturbance in the force control. Parameters which determine the dynamics of the robot are classified roughly into mass properties, such as link weight, center of gravity, and inertia tensor, and the friction and inertia inside a joint. The former mass properties can be calculated relatively easily and with high precision on the basis of CAD (Computer Aided Design) data. In contrast, the latter (especially friction) is hard to model and identify and becomes a factor which causes a large error.

A method of coping with the disturbance problem in the force control can be classified roughly into following three methods.

As a first method, it is conceivable to perform the design of eliminating a deceleration mechanism which becomes as a generation source of unknown friction as much as possible from a joint part. Specifically, the first method includes using a direct drive motor (for example, refer to JP-A-2007-124856) or a configuration (for example, refer to U.S. Pat. No. 5,587,937) which performs deceleration of a low reduction gear ratio using a wire mechanism. According to this method, although high-response force control becomes possible, there is a problem that the motor becomes bigger or a sufficient joint force is not obtained.

As a second method, a method of arranging a force sensor at a working point of a force, feeding back the deviation between a generation force and a force command value to a joint command value, and suppressing a disturbance exerted on the generation force at the action point is conceivable (for example, refer to "Robust Motion Control by Disturbance Observer" (Journal of Robotics Society of Japan, Vol. 11, No. 4, pp. 486-493, 1993) by Onishi). According to this method, it becomes possible to suppress all disturbances, such as a disturbance force received from a cable as well as the disturbance inside the joint, whereas there is a constraint that interaction is limited to a part in which the force sensor is set. In other words, in order to allow interaction in an arbitrary part of a whole body, expensive force sensors should be mounted in various places of the body.

As a third method, a method of calculating a joint force for generating a desired force in a predetermined part of the body while the dynamics of the robot is taken into consideration is conceivable (for example, refer to "A prioritized multi-objective dynamic controller for robots in human environments" (In Proceeding of the IEEE/RSJ International Conference on Humanoid Robots, 2004)). For example, in the specification of Patent Application No. 2007-272099 already transferred to the present applicant, a control system is disclosed which determines generation force target values of all actuators by detecting contact parts with the outside without omission, using contact sensors arranged in a distributed manner over the whole body surface of a link structure, such as a robot, and by exactly solving a mechanical model so that a desired motion may be achieved, while properly using external forces having the detected contact parts as points of action. According to the control system, favorable tactile force interaction in which points of action are not limited can be realized by compensating a force, which is difficult to model, within each joint which connects between links by a torque sensor provided at a joint part.

However, in the third method, it is necessary to use an "actuator which makes an ideal behavior" for the joint part so that the friction and inertia of the joint part which become key factors of errors match a theoretical model. Additionally, it is assumed that a reducer is included in the actuator and that the actuator makes a behavior according to the theoretical model as a system including the reducer.

According to the third method, since errors of parameters other than parameters inside a joint can generally be made small, the precision of a generation force also becomes favorable. It becomes possible to utilize a reducer, and it also becomes possible to obtain a large joint force by a small motor. Additionally, since the force feedback from a force sensor is not used, it is also not necessary to mount force sensors in various places.

SUMMARY OF THE INVENTION

In view of the above, it is desirable to provide excellent actuator control device and actuator control method which can suitably control driving of joint actuators by a force control method which directly controls a joint generation force, an actuator, a robot apparatus, and a computer program.

It is also desirable to provide excellent actuator control device and actuator control method which can favorably perform force control suitable for physical interaction with a human being while coping with factors of disturbances whose modeling or identifying is difficult, such as friction or inertia, which exists in joint parts, an actuator, a robot apparatus, and a computer program.

It is also desirable to provide excellent actuator control device and actuator control method which can favorably perform force control suitable for physical interaction with a human being while coping with a disturbance problem by calculating a joint force for generating a desired force in a predetermined part of a body while the dynamics of the robot is taken into consideration, an actuator, a robot apparatus, and a computer program.

According to a first embodiment of the present invention, there is provided an actuator control device for force-controlling a joint driving actuator according to a commanded joint force command value $\tau_a$. The actuator control device includes a joint value detecting means for detecting a joint value q at an output stage of the actuator, an action force detecting means for detecting an action force $\tau_e$ in a joint driving direction at the output stage of the actuator, and a driving force determining means for determining an instructed driving force $\tau$ to the actuator, on the basis of an ideal response model of the actuator which specifies the relationship of a joint value acceleration target value achieved as the actuator responds ideally when the joint force command value $\tau_a$, the action force $\tau_e$, and a joint value velocity obtained by time-differentiating the joint value q are given.

Although a method of controlling joint actuators of a robot which form a multi-link structure is classified roughly into a positional control and a force control, the force control of directly controlling a joint generation force and directly controlling a force is suitable in order to carry out more flexible physical interaction service with human beings in terms of force.

However, the force control tends to be influenced by a disturbance and has a problem that a system configuration is complicated. The main factors of the disturbance are friction and inertia which exist in a joint part, and since modeling and identifying of the friction and inertia are difficult, there is a possibility that a large error is invited.

Although the actuator control device according to the embodiment of the present invention controls driving of a joint actuator by a force control method, an attempt to deal with the disturbance problem is made by calculating a joint force for generating a desired force in a predetermined part of the body while the dynamics of the robot is taken into consideration. According to this coping method, since errors of parameters other than parameters inside a joint can generally be made small, the precision of a generation force also becomes favorable. It becomes possible to utilize a reducer, and it also becomes possible to obtain a large joint force by a small motor. Additionally, since the force feedback from a force sensor is not used, it is also not necessary to mount force sensors in various places.

The actuator control device according to the embodiment of the present invention is adapted to determine the driving force $\tau$ to be assigned to a joint on the basis of an ideal response model of an actuator when the device force-controls the joint driving actuator according to the commanded joint force command value $\tau_a$. The expression "ideal response model" is configured by a secondary differential equation that specifies the relationship of a joint value acceleration target value achieved as the actuator responds ideally when the joint force command value $\tau_a$, the action force $\tau_e$, and a joint value velocity obtained by time-differentiating the joint value q are given.

Additionally, the actuator control device includes a joint value detecting means, including an encoder or the like, for detecting a joint value q at an output stage of the actuator, an action force detecting means, such as a torque sensor, which detects an action force $\tau_e$ in a joint driving direction at the output stage of the actuator, and uses these detection results as inputs when the driving force $\tau$ is determined.

The ideal response model of the actuator including a secondary differential equation shall include an virtual inertia or an virtual viscous resistance coefficient $\upsilon_a$ which acts according to the magnitude of the joint value velocity obtained by time-differentiating the joint value q. The expression "virtual inertia or virtual viscous resistance coefficient $\upsilon_a$" is a parameter of dynamics, included inside a joint, whose modeling is difficult, and becomes a key factor of a disturbance. However, by including the virtual inertia or virtual viscous resistance coefficient in the ideal response model, the driving force determining means can suppress influence of the disturbance to determine the driving force τ with high precision.

Additionally, the driving force determining means is adapted to apply a disturbance observer to remove influence of a disturbance resulting from friction or inertia, etc. inside a joint whose modeling becomes difficult, and can determine the driving force τ of the actuator with high precision in conformity with the theoretical response model.

Here, the disturbance observer is adapted to estimate a driving force which has acted on the joint on the basis of the joint value velocity obtained by time-differentiating the joint value q detected by the joint value detecting means when the joint actuator is driven by the driving force τ determined by the driving force determining means, and subtract the estimated driving force from the driving force τ to calculate a disturbance joint force $\tau_d$.

Thus, the driving force determining means can correct a joint force target value $\tau^{ref}$, which is based on the joint value acceleration target value obtained from the ideal response model, by the disturbance joint force $\tau_d$ obtained by the disturbance observer in a previous control cycle, and determine the driving force τ in the current control cycle.

According to a second embodiment of the present invention, there is provided a computer program described in a computer readable format so as to execute processing for force-controlling a joint driving actuator according to a commanded joint force command value $\tau_a$ on a computer. The program causes the computer to function as a joint value detecting means for detecting a joint value q at an output stage of the actuator, an action force detecting means for detecting an action force $\tau_e$ in a joint driving direction at the output stage of the actuator, and a driving force determining means for determining an instructed driving force τ to the actuator, on the basis of an ideal response model of the actuator which specifies the relationship of a joint value acceleration target value achieved as the actuator responds ideally when the joint force command value $\tau_a$, the action force $\tau_e$, and a joint value velocity obtained by time-differentiating the joint value q are given.

The computer program according to the second embodiment of the present invention defines a computer program stated in a computer-readable format so as to realize predetermined processing on a computer. In other words, by installing the computer program according to the second embodiment of the present invention in a computer, cooperative operation can be exhibited on the computer, and the same operational effects as the actuator control device according to the first embodiment of the present invention can be obtained.

Additionally, the actuator control device according to the embodiment of the present invention can be applied to force control of at least some joint actuators, in a robot apparatus including a link structure constructed by connecting a plurality of rigid body links, and joint actuators which drive joints which connect between the links. For example, when dynamics operation is applied to perform force control of a robot, it is premised that an actuator behaves ideally so that friction and inertia of a joint part which become key factors of errors match a theoretical model. Although an actuator generally includes a reducer, and errors, such as unknown friction, exist inside a joint, the force control can be realized suitably if an ideal response of the joint actuator is achieved by the present invention.

According to the embodiment of the present invention, it is possible to provide excellent actuator control device and actuator control method which can favorably perform force control suitable for physical interaction with a human being while coping with factors of disturbances whose modeling or identifying is difficult, such as friction or inertia, which exists in joint parts, an actuator, a robot apparatus, and a computer program.

Additionally, according to the embodiment of the present invention, it is possible to provide excellent actuator control device and actuator control method which can favorably perform force control suitable for physical interaction with a human being while coping with a disturbance problem by calculating a joint force for generating a desired force in a predetermined part of a body while the dynamics of the robot is taken into consideration, an actuator, a robot apparatus, and a computer program.

According to the actuator control device related to the present invention, an ideal (in other words, virtualized) actuator which behaves as a theoretical model can be constructed. Accordingly, by applying the ideal actuator to a joint of a robot, it is possible to solve a disturbance problem in the force control by a method of calculating a joint force for generating a desired force in a predetermined part of the body while the dynamics of the robot is taken into consideration. As a result, it is possible to provide a robot which can perform flexible force interaction with a human being and an environment in an arbitrary part. Additionally, even if an hexa-axial force sensor is not arranged over the whole body of a robot, the control of generation force, acceleration, speed, and position in an arbitrary parts of the body can be performed favorably.

Other objects, features, and advantages of the present invention will become apparent from the embodiments of the present invention to be described later or more detailed description based on the attached drawings.

DESCRIPTION OF THE PREFERRED EMBODIMENTS

Hereinafter, embodiments of the present invention will be described in detail with reference to the drawings.

Figure 1A:
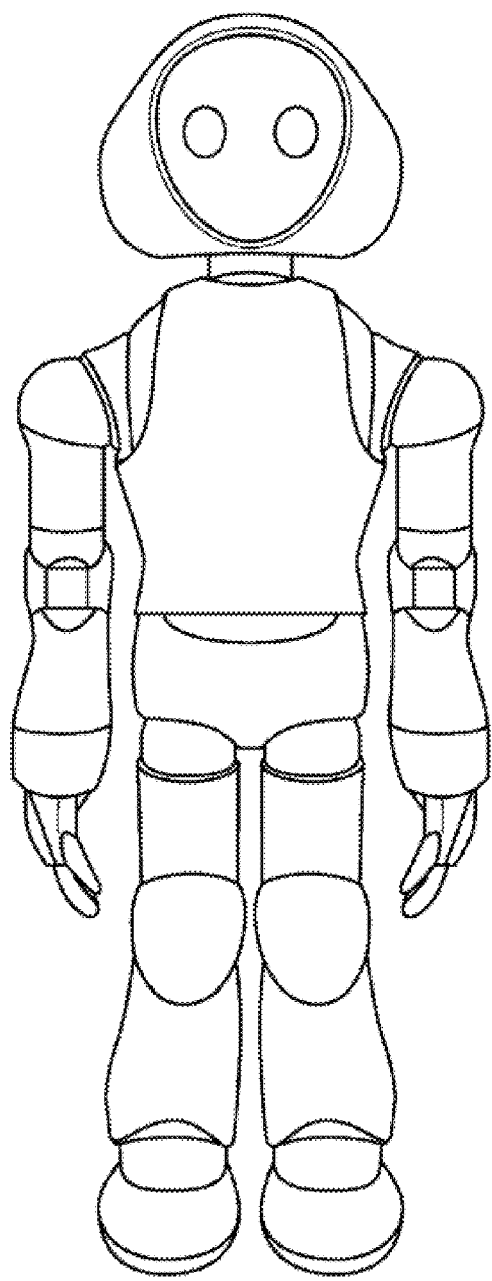
FIG. 1A is a front view of a humanoid robot to which the invention can be applied.
Figure 1B:
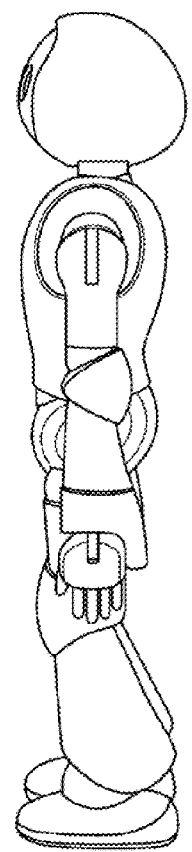
FIG. 1B is a left side view of the humanoid robot to which the invention can be applied.
Figure 1C:
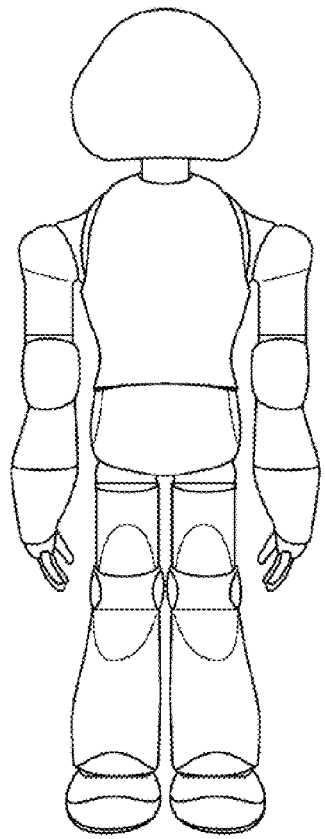
FIG. 1C is a back view of the humanoid robot to which the invention can be applied.
Figure 1D:
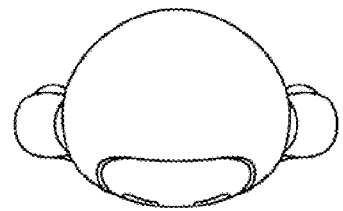
FIG. 1D is a top view of the humanoid robot to which the invention can be applied.
Figure 1E:
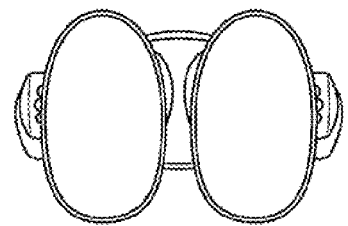
FIG. 1E is a bottom view of the humanoid robot to which the invention can be applied.
Figure 1F:
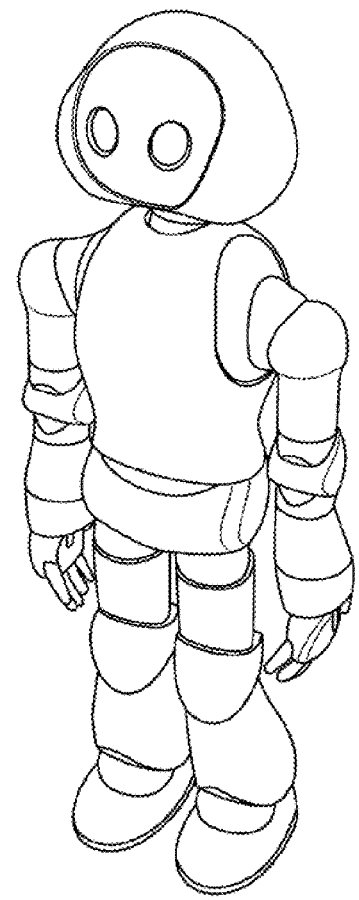
FIG. 1F is a perspective view of the humanoid robot to which the invention can be applied.
Figure 1G:
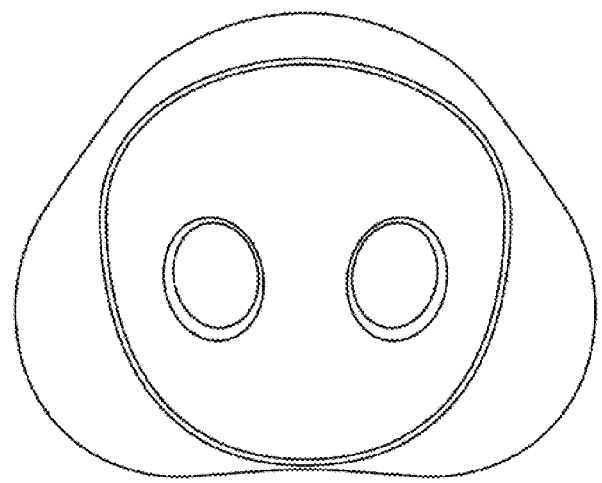
FIG. 1G is a front view of a head part of the humanoid robot to which the invention can be applied.
Figure 1H:
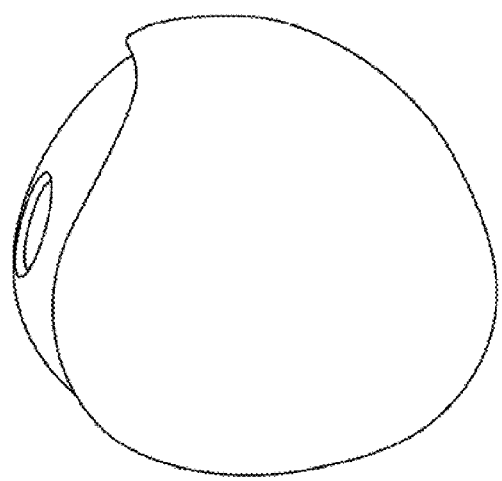
FIG. 1H is a left side view of the head part of the humanoid robot to which the invention can be applied.
Figure 1I:
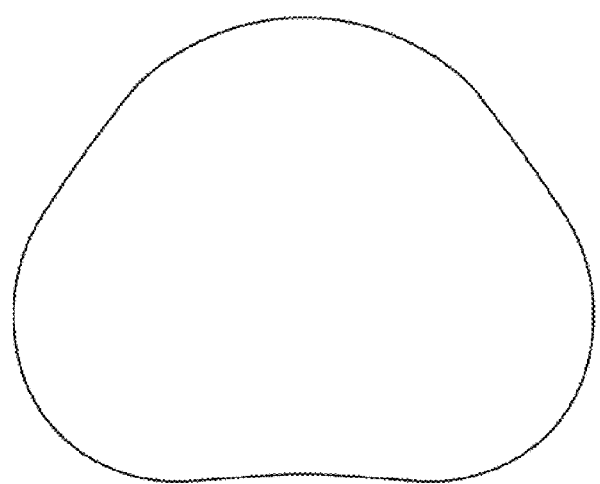
FIG. 1I is a back view of the head part of the humanoid robot to which the invention can be applied.
Figure 1J:
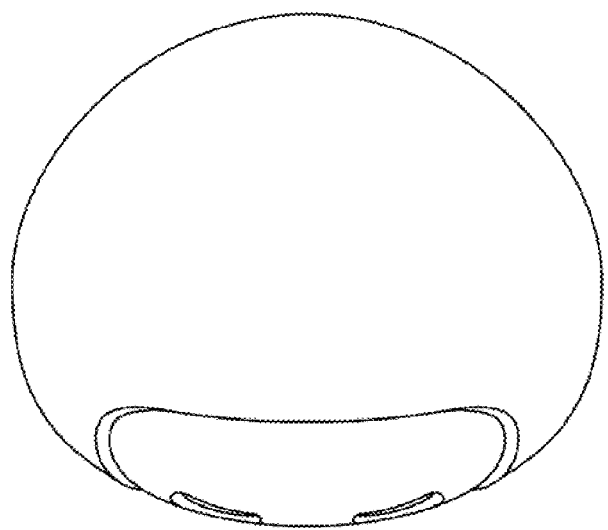
FIG. 1J is a top view of the head part of the humanoid robot to which the invention can be applied.
Figure 1K:
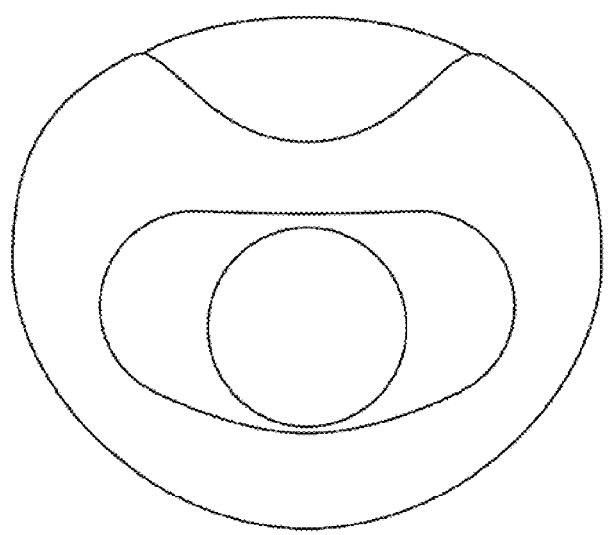
FIG. 1K is a bottom view of the head part of the humanoid robot to which the invention can be applied.
Figure 1L:
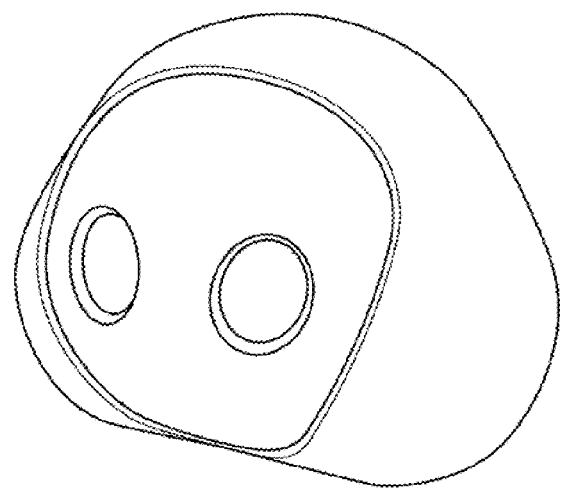
FIG. 1L is a perspective view of the head part of the humanoid robot to which the invention can be applied.
Figure 2:
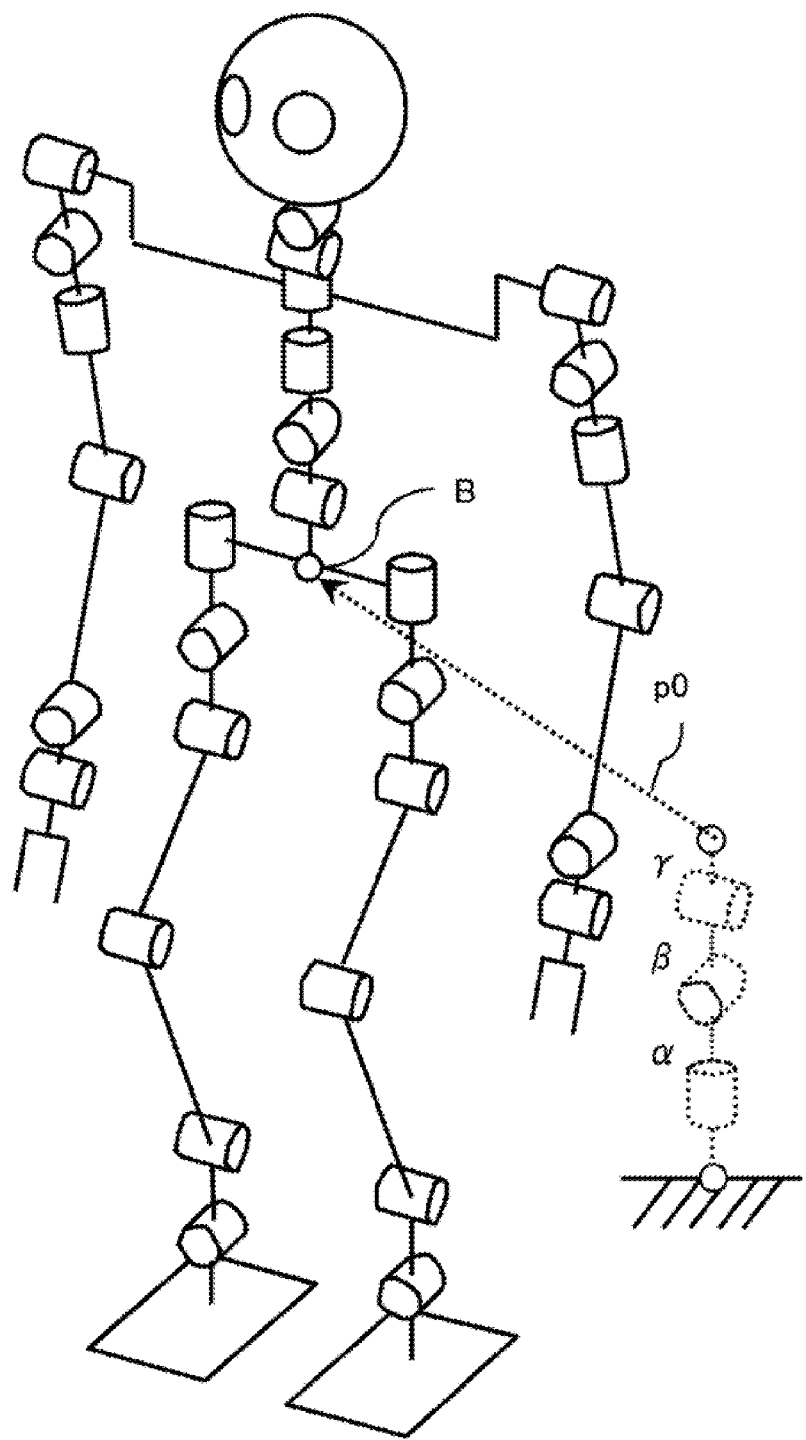
FIG. 2 is a view showing a joint degree-of-freedom model of the humanoid robot shown in FIGS. 1A to 1L.

A front view, a left side view, a back view, a top view, a bottom view, and a perspective view of a humanoid robot to which the invention can be applied are shown in FIGS. 1A to L, and a front view, a left side view, a back view, a top view, a bottom view, and a perspective view of a head part of the robot are respectively shown in FIGS. 1A to 1L. A joint degree-of-freedom model of the humanoid robot shown in FIGS. 1A to 1L is shown in FIG. 2. In the humanoid robot shown, an upper body is connected to a pelvic part via two leg bodies as a moving means, and a waist joint. Two arm parts are connected to the upper body, and a head part is connected to the upper body via a neck joint.

The right and left leg bodies are provided with a total of six degrees of freedom including three degrees of freedom of a hip joint, one degree of freedom of a knee joint, and two degrees of freedom of an ankle joint, respectively. Additionally, the right and left arm parts are provided with a total of six degrees of freedom including three degrees of freedom of a shoulder joint, one degree of freedom of an elbow joint, and two degrees of freedom of a wrist joint, respectively. Both the neck joint and the waist joint have three degrees of freedom around X, Y, and the Z axes.

Figure 3:
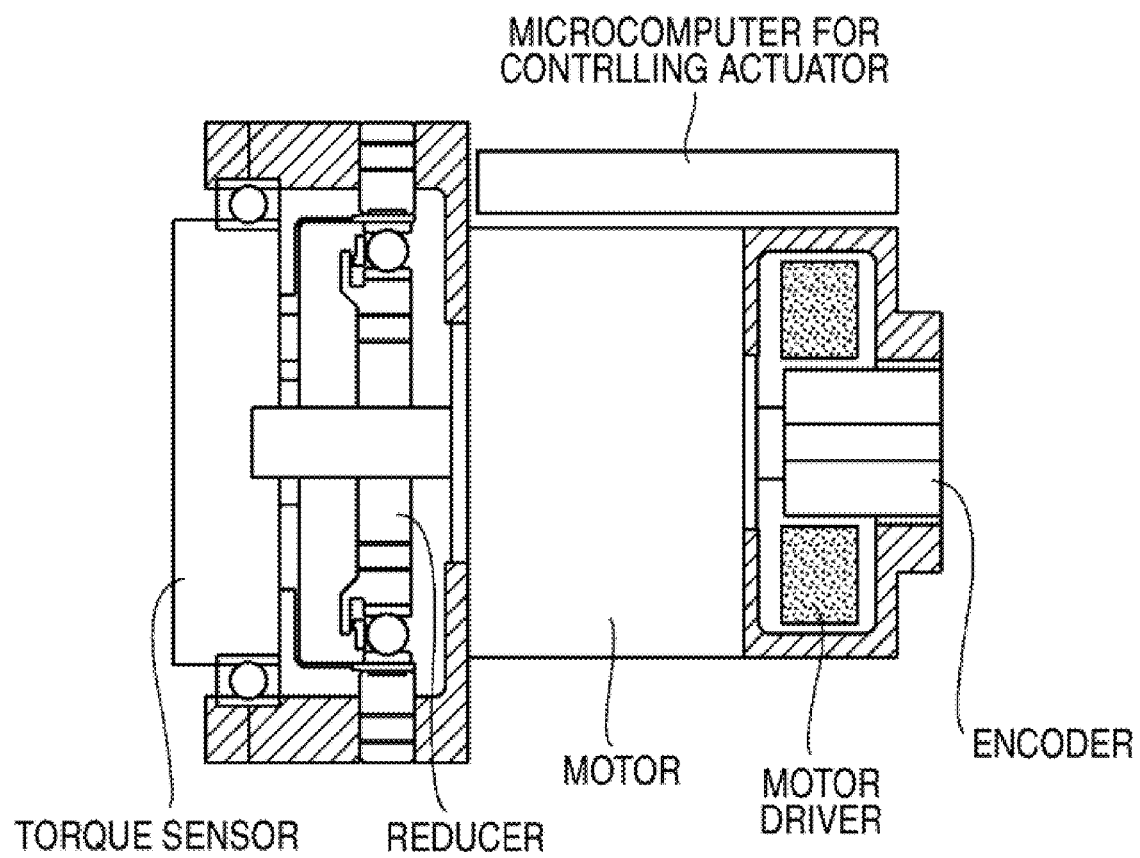
FIG. 3 is a view showing a configuration of an actuator which drives each joint shaft.

FIG. 3 shows a configuration of an actuator which drives each joint shaft. The illustrated actuator includes a motor (for example, a DC brushless motor) for generating rotary torque, an electric current control type motor driver for driving the motor, and a reducer for converting a rotary force of the motor into a sufficient generation force. Additionally, an encoder for measuring a joint angle and a torque sensor which detects the rotary torque are attached to an output shaft of the reducer. It should be noted that parameters of dynamics, such as friction or inertia, whose modeling or identifying becomes difficult, are included in a joint part.

Figure 4A:
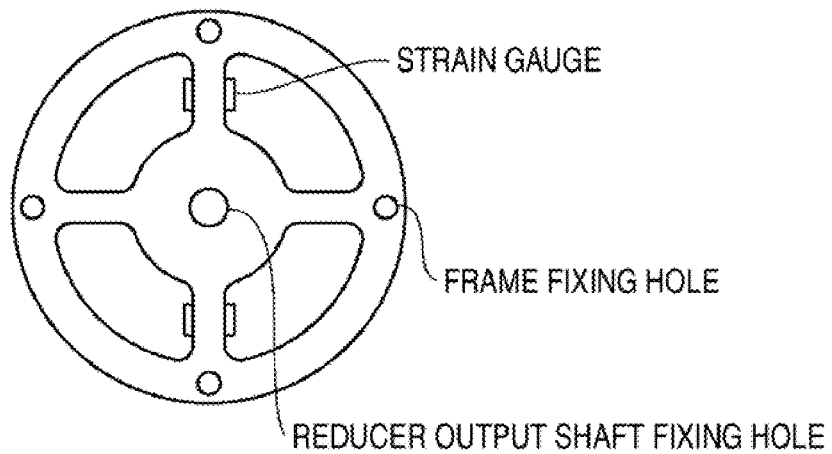
FIG. 4A is a view showing a configuration of a torque sensor attached to an output shaft of a reducer.
Figure 4B:
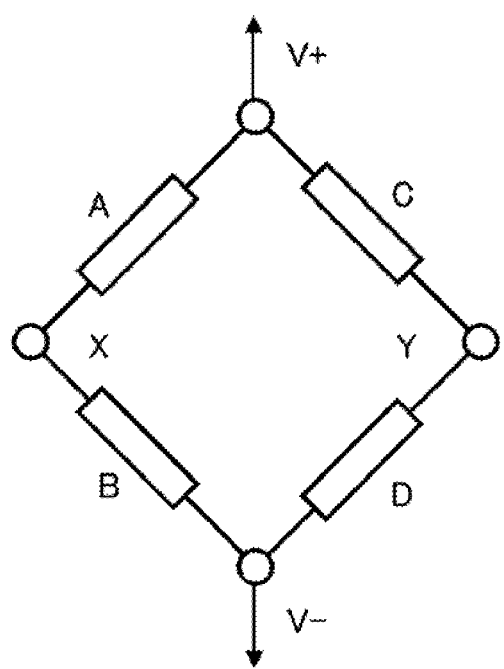
FIG. 4B is a view showing an equivalent circuit of the torque sensor.

A configuration of the torque sensor attached to the output shaft of the reducer is shown in FIG. 4A. The illustrated torque sensor has a rare distorted structure, and has a configuration in which the volume of infinitesimal deformation is measured by two pairs of strain gauges A to D which are stuck on a beam portion so as to face each other. An equivalent circuit of the torque sensor is shown in FIG. 4B. When deformation is caused in the rare distorted structure by the torque (external torque) $\tau_e$ applied to the output shaft of the reducer, the volume of deformation is measured as a potential difference approximately proportional to $\tau_e$ at both ends of a bridge circuit including resistors A to D. Such torque measurement results are collected by a microcomputer for control set in the actuator, and are then transmitted to a host computer (which will be described later).

Figure 5:
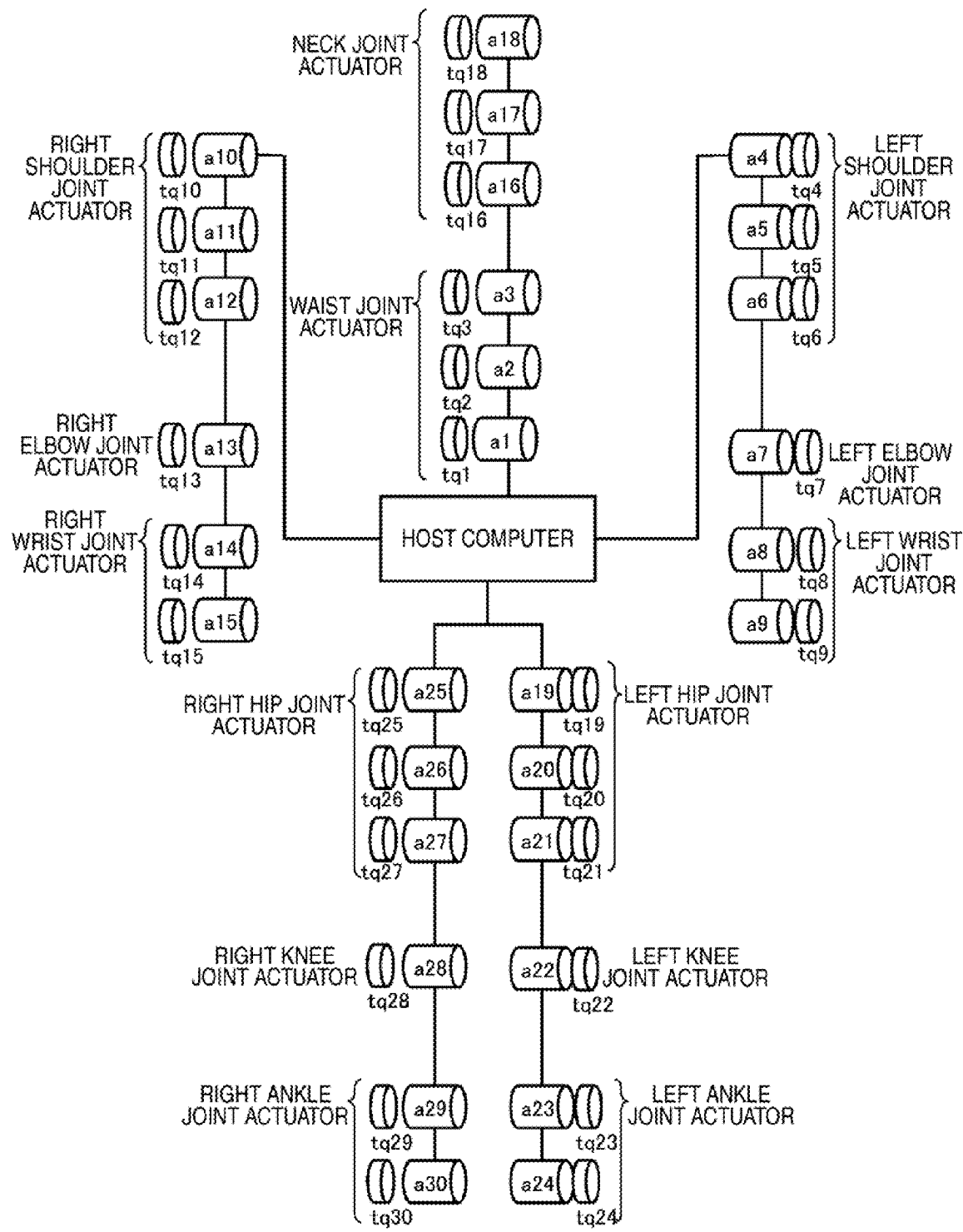
FIG. 5 is a view showing a configuration of the connection topology in the humanoid robot shown in FIGS. 1A to 1L.

FIG. 5 shows a configuration of the connection topology in the humanoid robot shown in FIGS. 1A to 1L. Each joint driving actuator is connected with a host computer which generally controls the whole operation of the humanoid robot, so that torque control target value thereof can be given from the host computer, and a current output torque, a current joint angle or a current joint angular velocity can be transmitted to the host computer.

The humanoid robot has triaxial waist joint actuators a1, a2, a3, and triaxial neck joint actuators a16, a17, and a18 in a body part, and these actuators are serially connected to the host computer. Additionally, the torque sensors tq16, tq17, and tq18 shown in FIG. 4A are arranged between an output shaft of each of the actuator motors a16, a17, and a18, and the frame. Each joint actuator receives a positional control target value thereof through a serial cable, and transmits a current output torque, a joint angle, and a joint angular velocity to the host computer.

Additionally, the humanoid robot has triaxial shoulder joint actuators a4, a5, and a6, a uniaxial elbow joint actuator a7, and biaxial wrist joint actuators a8 and a9 in a left arm part, torque sensors tq4, tq5, tq6, tq7, tq8, and tq9 shown in FIG. 4A are arranged between an output shaft of each of the actuator motors a4, a5, a6, a7, a8, and a9, and the frame, and these torque sensors are serially connected to the host computer. Similarly, the humanoid robot has triaxial shoulder joint actuators a10, a11, and a12, a uniaxial elbow joint actuator a13, and biaxial wrist joint actuators a14 and a15 in a right arm part, torque sensors tq10, tq11, tq12, tq13, tq14, and tq15 shown in FIG. 4A are arranged between an output shaft of each of the actuator motors a10, a11, a12, a13, a14, and a15, and the frame, and these torque sensors are serially connected to the host computer.

Additionally, the humanoid robot has triaxial hip joint actuators a19, a20, and a21, a uniaxial knee joint actuator a22, and biaxial ankle joint actuators a23 and a24 in a left leg part, torque sensors tq19, tq20, tq21, tq22, tq23, and tq24 shown in FIG. 4A are arranged between an output shaft of each of the actuator motors a19, a23, a21, a22, a23, and a24, and the frame, and these torque sensors are serially connected to the host computer. Similarly, the humanoid robot has triaxial hip joint actuators a25, a26, and a27, a uniaxial knee joint actuator a28, and biaxial ankle joint actuators a29 and a30 in a right leg part, torque sensors tq25, tq26, tq27, tq28, tq29, and tq30 shown in FIG. 4A are arranged between an output shaft of each of the actuator motors a25, a26, a27, a28, a29, and a30, and the frame, and these torque sensors are serially connected to the host computer.

The dynamics operation of the robot is executed on the host computer to generate the torque target value of each joint actuator. The torque target value is transmitted to a control microcomputer juxtaposed to the actuator, and is used for control of the actuator executed on the control microcomputer. Additionally, each joint actuator is controlled by a force control method.

According to a method of calculating a joint force for generating a desired force in a predetermined part of a body while the dynamics of the robot is taken into consideration, the influence of disturbance in force control can be avoided. However, it is necessary to use an ideal actuator for a joint so that the friction and inertia of a joint part which become key factors of errors match a theoretical model.

Here, when a joint actuator performs a response which has deviated from a theoretical model used in the dynamics operation, a desired motional state is not achieved even if the torque calculated by dynamics operation is made act on the actuator. Actually, unknown parameters of dynamics, such as friction, which cannot be modeled, are included in an actuator with a reducer as shown in FIG. 4A, and become key factors of disturbance which affects force control. If a measure for such a disturbance problem is not taken, the response deviates easily from a theoretical model.

Thus, in this embodiment, an attempt to deal with the disturbance problem is made by the third method of calculating a joint force for generating a desired force in a predetermined part of the body while the dynamics of the robot is taken into consideration. In such a case, it becomes unnecessary to dispose a hexa-axial force sensor in any parts of the body.

Hereinafter, a method of correcting the response of an actuator such that a response according to a theoretical model is performed even if influence of disturbance, such as friction or inertia, which cannot be modeled is exerted, will be described.

In the dynamics operation of the robot, the actuator is modeled by a numerical expression as shown in the following Expression (1).

$$I_a \ddot{q} = \tau_a - \tau_e - \nu_a \dot{q} \quad (1)$$

In the above Expression (1), $I_a$ is the virtual inertia of a joint, q is the joint angle of the joint (obtained as an encoder output), $\tau_a$ is a command value of the generation torque of the joint, $\tau_e$ is an external torque exerted by the joint, and $\nu_a$ is an unknown virtual viscosity coefficient (whose modeling becomes difficult) inside the joint.

It can be seen from the above Expression (1) that the term external torque $\tau_e$ which acts on the joint is included in the theoretical model. Accordingly, in order to correct the response of the actuator so as to be the response according to the theoretical model, it is necessary to detect the external torque $\tau_e$. In this embodiment, as described referring to FIGS. 4A and 4B, the torque sensor for measuring the external torque $\tau_e$ in the output shaft of a reducer is disposed in the actuator, and torque measurement results are collected by the microcomputer.

The fact that the actuator performs the response according to the theoretical model expressed by the above Expression (1) means that the joint angle acceleration at the left side of the above Expression (1) is attained when the right side of the Expression is given. In this embodiment, in order to configure such a joint angle acceleration control system, the joint torque τ is determined with high precision on the basis of a theoretical response model by applying a disturbance observer which estimates disturbance torque.

Figure 6:
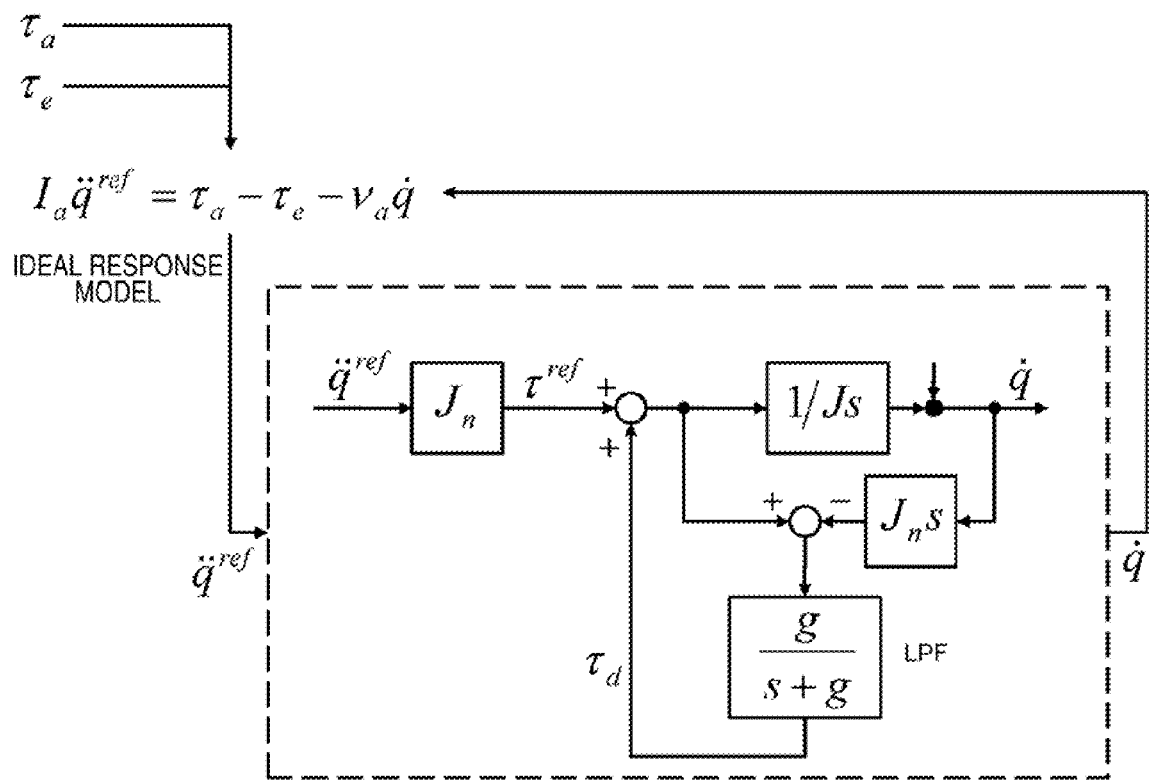
FIG. 6 is a control block diagram of a joint angle acceleration control system for performing a response according to a theoretical model.

A control block diagram of the joint angle acceleration control system for performing the response according to the theoretical model is shown in FIG. 6. In this drawing, a portion surrounded by a dotted line is equivalent to the disturbance observer, and a robust acceleration control system is built by estimating a disturbance torque $\tau_d$ and removing the influence which affects the control system. Here, $J_n$ is defined as a nominal value of the inertia within the joint, J is defined as an (unknown) actual value of the inertia within the joint, and q is defined as the joint angle. As for the virtual inertia $I_a$ of the joint, it is assumed that an virtual constant is given as a design item in the dynamics operation.

On the host computer, a torque command value $\tau_a$ for the actuator is determined in every control cycle by the force control method; an external torque actual measurement value $\tau_e$ measured by the torque sensor (refer to FIG. 4B) attached to the output shaft of the reducer of the actuator, and an angular velocity actual measurement value obtained from the joint angle q measured by the encoder attached to the output shaft of the reducer are sent from the control microcomputer within the actuator. Then, the torque command value $\tau_a$, the external torque actual measurement value $\tau_e$, and the angular velocity actual measurement value of the joint angle q are assigned to the theoretical response model expressed by the above Expression (1), an acceleration target value of the joint angle q at the left side of this numerical expression is calculated, and the angular acceleration target value is input to the disturbance observer.

Within the disturbance observer, the input acceleration target value of the joint angle q is multiplied by the virtual inertia nominal value $J_n$ of the joint, and the resulting value is converted into the torque target value $\tau^{ref}$ in a current control cycle. Then, when the torque target value $\tau^{ref}$ is corrected by the disturbance torque $\tau_d$ obtained in the previous control cycle by the disturbance observer, the torque command value τ for the joint in the current control cycle is obtained.

When the force control including the torque command value τ is made to a joint including a transfer coefficient $1/J_n$, the joint is rotationally driven while being influenced by disturbance, such as friction or inertia, which exists in the joint part. Specifically, the torque command value τ is converted into an electric current command value, and, this converted value is used as an instruction input to the motor driver. The generation torque $\tau_e$ and the joint angle q in that case are measured by the torque sensor and the encoder, respectively, and the joint angular velocity is obtained by time-differentiating the encoder output q.

The disturbance observer can estimate the torque which has acted on the joint by applying the transfer coefficient $J_n s$ including the virtual inertia nominal value $J_n$ of the joint to the angular velocity of the measured joint angle q, and can estimate the disturbance torque $\tau_d$ by subtracting the estimated torque from the torque command value τ to the joint. Also, the disturbance torque $\tau_d$ obtained in the current control cycle is fed back, and is used for correction of the torque command value τ in the next control cycle (same as the above). In addition, a low pass filter (LPF) expressed by g/(s+g) which has been inserted on the way is used to prevent the divergence of the system.

By doing so, even if an external disturbance component, such as inertia or friction, which cannot be modeled, exists in the joint part, the acceleration response of the actuator can be made to follow the acceleration target value. That is, when the right side of the above Expression (1) is given, the joint angle acceleration at the left side is attained. Thus, the response according to the theoretical model can be realized irrespective of the actuator being influenced by a disturbance. Here, the above low pass filter g/(s+g) which feeds back the disturbance torque $\tau_d$ is inserted (as mentioned above), and is not fit for removal of a disturbance in a high frequency region.

In addition, refer to, for example, the "Robust Motion Control by Disturbance Observer" (refer to "Robust Motion Control by Disturbance Observer" (Journal of Robotics Society of Japan, Vol. 11, No. 4, pp. 486-493, 1993) by Onishi) about the disturbance observer. The disturbance observer estimates an external disturbance component in a plant, and feeds back the component as a control input, whereby it is effective to reach a target state even if an unknown parameter change or an unknown disturbance is in the plant. Here, in order to estimate the disturbance correctly, it is necessary to repeat feedback operation in a plurality of cycles.

In the control block configuration shown in FIG. 6, the disturbance observer obtains the angular acceleration of the joint angle q according to the above Expression (1), and sets this acceleration to a joint angle acceleration target value for a joint actuator. The angular acceleration of the joint angle q is determined on the basis of the external torque $\tau_e$ obtained from the torque sensor attached to the output shaft of the reducer, the generation torque $\tau_a$ of the joint, and the time differential of the joint angle q output from the encoder attached to the output shaft of the reducer. By taking such a configuration, the joint is allowed to perform the response according to the inertia $I_a$ and the viscosity coefficient $\upsilon_a$ specified by a user, and is idealized or virtualized.

Figure 7:
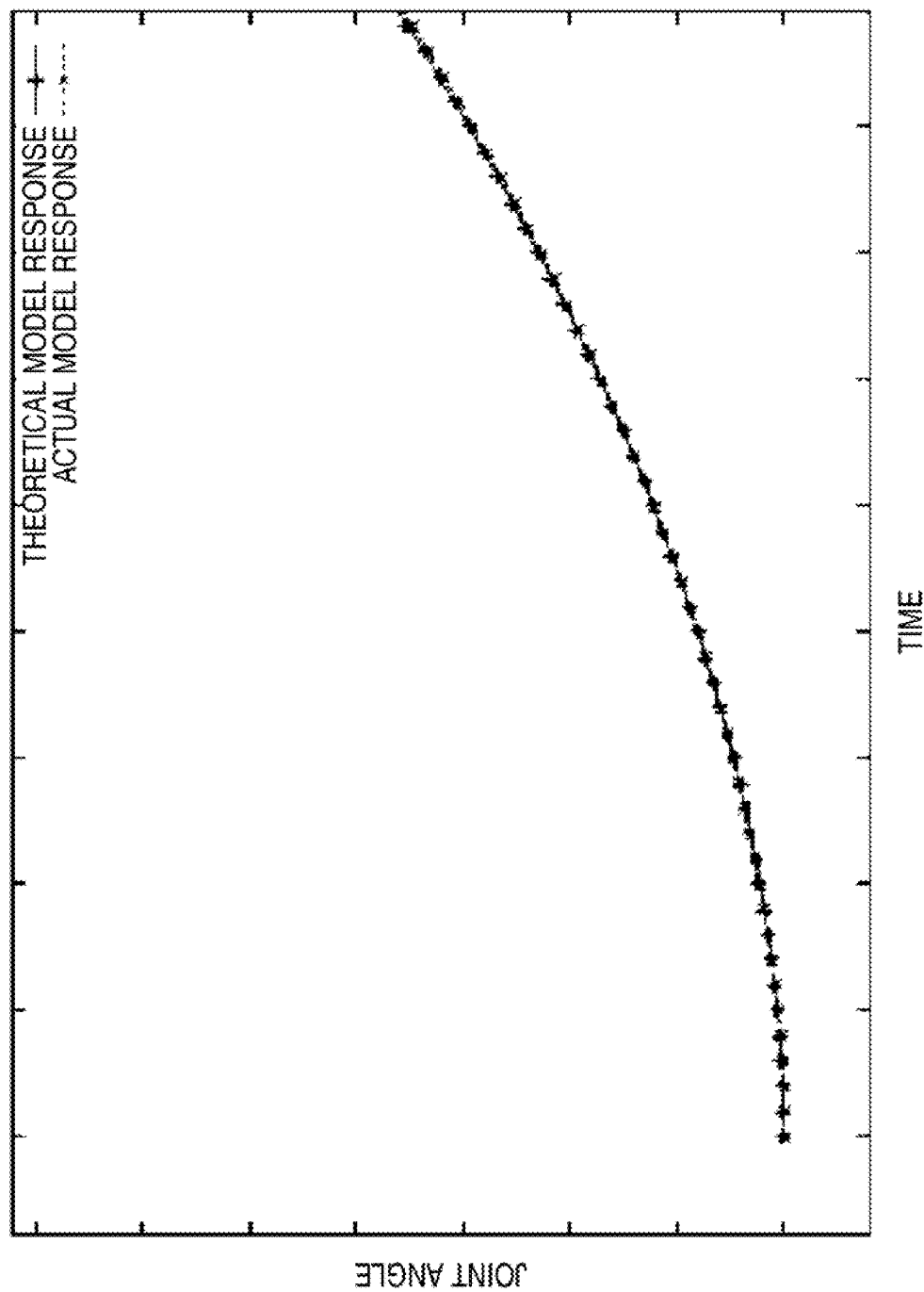
FIG. 7 is a graph showing the comparison between a theoretical response of a joint angle obtained by carrying out numerical calculation according to the inertia $I_a$ and viscosity coefficient $\upsilon_a$ specified by a user and an actual measurement response of the joint angle to which the control system shown in FIG. 6 is applied.

The comparison between a theoretical response of a joint angle obtained by carrying out numerical calculation according to the inertia $I_a$ and viscosity coefficient $\upsilon_a$ specified by a user and an actual measurement response of the joint angle to which the control system shown in FIG. 6 is applied is shown in FIG. 7. Here, the actual measurement of the joint angle was performed by applying the control system shown in FIG. 6 to an actuator in which a torque sensor is attached to a harmonic drive gearing having large friction.

According to the comparison results shown in FIG. 7, it can be seen that the actual measurement response in a case where the control system shown in FIG. 6 is applied substantially matches the theoretical response. Accordingly, by applying the control system shown in FIG. 6, it can be said that the existing actuator can be corrected as an actuator which performs a desired ideal response (that is, virtualized) even if an unknown external disturbance component, such as friction or inertia, is included in the joint part.

The actuator control as shown in FIG. 6 for realizing an ideal joint angle acceleration response by using the control system using the disturbance observer can be configured by relatively simple processing operation, and can be executed at a high sampling rate (for example, in a cycle of 100 microseconds) independently on a control microcomputer which is juxtaposed to each actuator.

Figure 8:
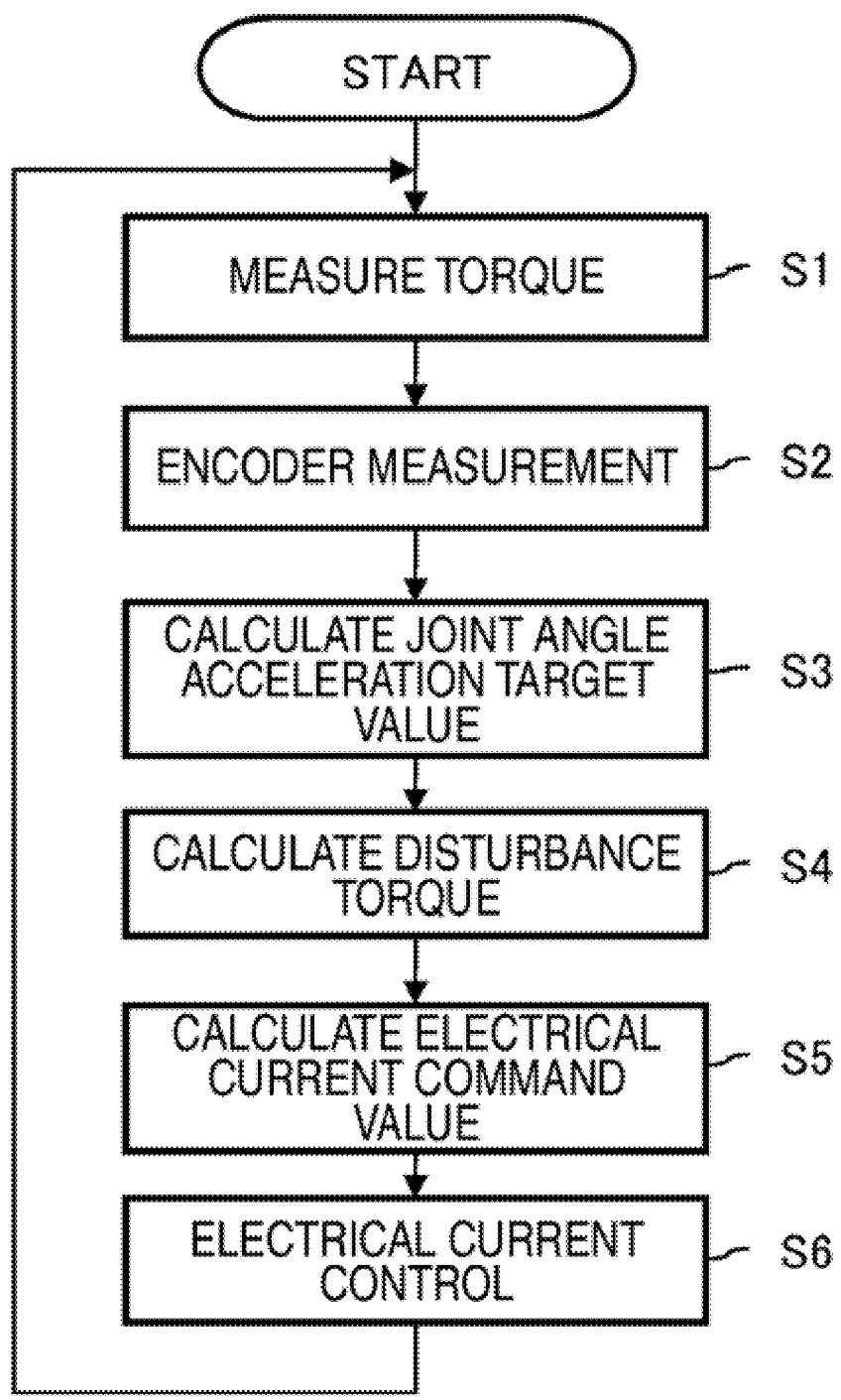
FIG. 8 is a flow chart showing a processing sequence of operation which realizes an ideal joint angle acceleration response.

A processing sequence of operation which realizes an ideal joint angle acceleration response is shown in the form of a flow chart in FIG. 8.

First, the value of a torque sensor attached to an output shaft of a reducer of an actuator is measured, and an external torque $\tau_e$ is obtained (Step S1).

Next, the value of an encoder attached to the output shaft of the reducer of the actuator is measured, and a joint angle q is obtained (Step S2). Further, the joint angle q is time-differentiated, and a joint angular velocity is obtained.

Next, a joint angle acceleration target value of the joint angle q is calculated using the above Expression (1) (Step S3). That is, the following Expression (2) is calculated.

$$\ddot{q}^{ref}=(\tau_a-\tau_e-\upsilon_a\dot{q})/I_a \quad (2)$$

Next, a disturbance torque $\tau_d$ is obtained by a disturbance observer (Step S4). A disturbance torque $\tau_d$ is calculated by the following Expression (3) from FIG. 6. Here, a torque command value $\tau$ in this expression is defined as a torque command value in a previous control cycle.

$$\tau_d = \frac{g}{s+g}(\tau - J_n S^2 q) \quad (3)$$

A torque command value $\tau$ in a current control cycle can be obtained by converting a joint angle acceleration obtained from the above Expression (2) in Step S2 into a torque target value $\tau^{ref}$, and by adding a disturbance torque $\tau_d$ obtained from the torque target value $\tau^{ref}$ by the above Expression (3).

$$\tau=J_n\ddot{q}^{ref}+\tau_d \quad (4)$$

Next, an electric current command value $i^{ref}$ to the motor driver is calculated by dividing the torque command value $\tau$ obtained from the above Expression (4) by a torque constant $K_t$ (Step S5).

$$i^{ref}=\tau/K_t \quad (5)$$

Then, the obtained electric current command value $i^{ref}$ is delivered to the motor driver, and electric current control is executed (Step S6).

For example, a method of applying dynamics operation to perform the force control of a robot is disclosed in JP-A-2007-108955 already transferred to the present applicant. When the idealized actuator as mentioned above is achieved, the force control of the robot using dynamics operation can be realized suitably.

In the joint degree-of-freedom model shown in FIG. 2, a bipedal walking mobile robot is expressed as an open link tree structure with a pelvis B as a basis. The robot can move freely in a world space, and can change its posture. Thus, Euler angle $\alpha=(\alpha, \beta, \gamma)^T$ of the pelvis B and the position $p_0(p_{0x}, p_{0y}, p_{0z})^T$ thereof are introduced as state variables for expressing the whole state of the robot. Then, a generalized variable q representing the whole posture of the robot can be expressed like the following Expression (6), using a vector θ in which all joint values serving as the current states of actuators can be enumerated, and a vector in which the posture α and position $p_0$ of a base are enumerated as the motion state of the robot.

$$q=(\alpha,p_0,\theta)^T \quad (6)$$

As an important concept in the robot control of a force control system, there is a concept called "operational space". The operational space is a space for describing the relationship between a force acting on the robot, and acceleration to be generated. The operational space becomes indispensable when a contact way between the robot and an environment is used as constraint conditions when joint angles of the robot are not position-controlled, but force-controlled. In a link structure in which a rigid body link is connected via joints, a vector in which all values of the joints can be enumerated is called a generalized variable, and is expressed by q. When the relationship with a time differential value of the generalized variable q is associated like the following Expression (7), using Jacobian J, an operational space can be defined with respect to a physical quantity x.

$$\dot{x}=J\dot{q} \quad (7)$$

The Cartesian coordinate system for execution of a task, such as a finger position posture at the tip of a manipulator, is an example of the operational space. As for the basic idea of the operational space, refer to, for example, "A unified approach to motion and force control of robot manipulators" (The operational space formulation, IEEE Journal of Robotics and Automation, and RA-3 (1), pp. 43-53, 1987).

Generally, it is known that the equation of motion of the whole link structure can be expressed as shown in the following Expression (8).

$$\tau=H\ddot{q}+b-J^T f \quad (8)$$

Here, $\tau$ is a generalized force corresponding to the generalized variable q, b is the gravitational force/Coriolis force, and f is an external force acting on the operational space. The above Expression (8) is changed like the following Expression (9).

$$\ddot{x}=\Lambda^{-1}f+c \quad (9)$$

Here, $\Lambda^{-1}$ is called an operational space inertia inverse matrix, and is expressed like the following Expression (10). Here, H is an inertia matrix for a joint space of the whole structure.

$$\Lambda^{-1} = JH^{-1}J^T \quad (10)$$

Additionally, c of a third term of a right side of the above Expression (9) is equivalent to an operational space bias acceleration (that is, the acceleration acting on an operational space in a case where an external force does not act), and is expressed like the following Expression (11).

$$c = JH^{-1}(\tau - b) + \dot{J}\dot{q} \quad (11)$$

The operational space, i.e., the relationship between acceleration and a force are given by an operational space inertia inverse matrix. In addition, in the calculation as defined in the above. Expression (10), an inertia matrix H for a joint space of the whole structure is interposed, and thus, needless calculation is made. Therefore, a great amount of calculation is needed in the calculation of the operational space inertia inverse matrix. Therefore, there is a problem that this is not fit for real-time processing. In contrast, by applying the direct dynamics operation which obtains generalized acceleration (joint acceleration) from the generalized force (joint force) of the link structure, the operational space inertia inverse matrix can be calculated at high speed, and calculational load can be relieved. As for a high-speed calculation method of the operational space inertia inverse matrix and the bias acceleration, refer to JP-A-2007-108955 already transferred to the present applicant.

In the method of controlling a robot using dynamics operation, in order to achieve various motion objects, it is possible to take two-step release of obtaining an virtual force f acting on an operational space as a first step and of converting the virtual force f into an external force from a joint torque and an environment which exist actually as a second step (for example, refer to the specification of JP-A-2007-272099 already transferred to the present applicant).

As the first step, the virtual force f to be applied to the operational space can be obtained by solving linear complementary problems as shown in the following Expressions (12) and (13).

$$\ddot{x} = \Lambda^{-1}f + c \quad (12)$$

$$f_{min_i} \leq f_i \leq f_{max_i} \quad (13)$$

Additionally, if a requirement under which a known force $f_k$ is generated in an operational space $J_k$ is given as a motion requirement for a force, in conjunction with the above motion requirements for positions, velocity, and acceleration, a virtual force, i.e., a generalized force $\tau_v$ which is required as a whole is expressed like the following Expression (14).

$$\tau_v = J^T f + J_k^T f_k = J_v^T f_v \quad (14)$$

Here, fv is a coupling vector of f and $f_k$, and $J_v$ is a Jacobian representing an operational space of $f_v$ in which J and $J_k$ are enumerated longitudinally.

In the second step, as shown in a following Expression (15), the virtual force $f_v$ is converted into an external force $f_e$ obtained from an environment and a torque $\tau_a$ of an actuator of a joint part. $f_v$ is a virtual force including even a force which does not exist actually.

$$J_v^T f_v = J_e^T f_e + J_a^T f_a \quad (15)$$

Here, $J_e$ and $J_a$ are Jacobians corresponding to an operational space on which $f_e$ and $\tau_a$ act.

$f_e$ and $\tau_a$ which satisfy Expression (15) do not always exist. Thus, a corrected component $\Delta f_v$ of the virtual force $f_v$ of the above Expression is taken into consideration.

$$J_v^T(f_v - \Delta f_v) = J_e^T f_e + J_a^T f_a \quad (16)$$

The solution of the above Expression (16) can be obtained by solving such problems as the following Expressions (17) and (18).

$$\min \frac{1}{2} e^T Q_1 e + \frac{1}{2} y^T Q_2 y \quad (17)$$

subject to $$Ay \geq d \quad (18)$$

Here, e is a value which is obtained by subtracting a right side from a left side of the above Expression (16), and which gives an error of the above Expression (16). Further, y is a coupling vector of $\tau_a$, $f_e$, and $\Delta f_v$. Thus, a first term of the above Expression (17) represents a condition for minimization of an error for satisfaction of the above Expression (16), and a second term of the above Expression (18) represents a condition for minimization of a virtual force correction amount $\Delta f_v$, an actual force $f_e$, and $\tau_a$. $Q_1$ and $Q_2$ are positive definite symmetric matrices representing the weight for minimization therebetween. An inequality constraint expression (18) gives upper limits, lower limits, etc. of a vertical reaction force, a friction condition, and a joint generation force.

If the above Expression (17) and (18) are arranged, they are formulated as secondary programming problems as shown in the following Expressions (19) and (20).

$$\min \frac{1}{2} y^T Q y + r^T y \quad (19)$$

subject to $$Ay \geq d \quad (20)$$

By using the secondary programming problems, the above Expressions (19) and (20) can be solved with respect to y, and further, $\tau_a$, $f_e$, and $\Delta f_v$. The torque $\tau_a$ of the actuator of the joint part obtained by solving these expressions may act on the robot.

According to the force control method based on the dynamics operation as described above, the value of a hexa-axial force sensor is not required. Here, even if the obtained $\tau_a$ is applied to a general actuator, an error, such as unknown friction, exists and a desired value cannot be obtained. Additionally, the response characteristics also deviate from the ideal joint model (the above Expression (1)) used for the above dynamics operation, and the motion objects are also hardly achieved. In contrast, when the actuator which is provided by the invention and which allows an ideal response is used, a joint response as premised by dynamics operation is allowed, and the motion objects of the whole robot can be achieved favorably.

In addition, the above-described operation is executed at a lower sampling rate than the control operation for idealization of an actuator. For example, it is assumed that the above operation is executed in a cycle of 1 millisecond.

Additionally, although numerical differentiation and a low pass filter have been used in the above-described embodiment in order to obtain the joint angle acceleration which is required inside the disturbance observer, these become factors which reduce the response of an actuator. In order to measure the joint angle acceleration directly, an actuator may be directly provided with an acceleration detector.

Figure 9:
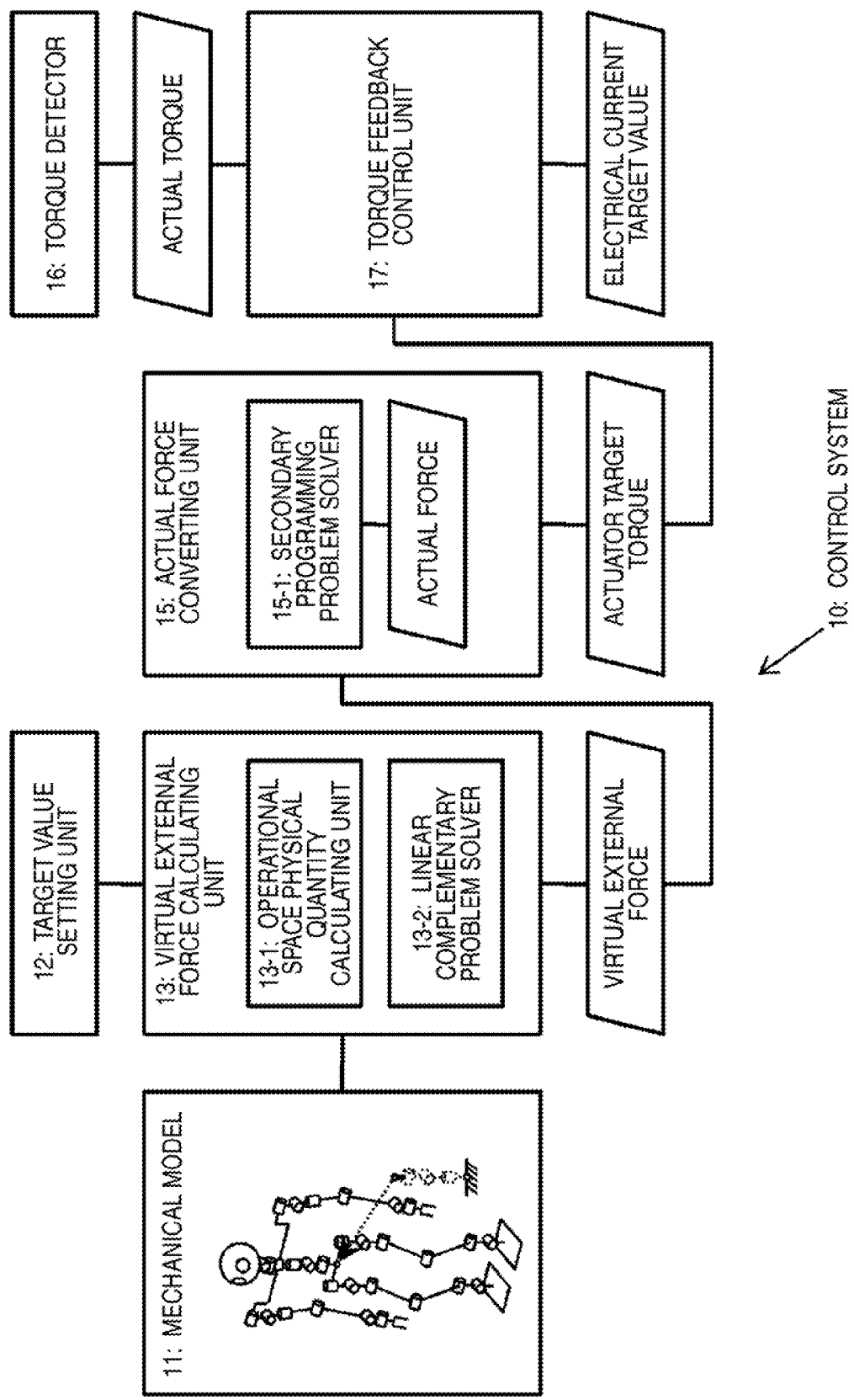
FIG. 9 is a functional block diagram of a control system of a robot by a force control method based on dynamics operation.

A functional block diagram of a control system 10 of a robot by the force control method based on the dynamics operation is shown in FIG. 9.

A mechanical model 11 holds geometric parameters and dynamical parameters of rigid body links of a robot to be controlled. Physical quantities which vary every moment according to the current state of the robot, such as joint angles, are also included in the data which the mechanical model 11 holds.

The target value setting unit 12 sets target values relating to positions, velocity, acceleration, posture, angular velocity, angular acceleration, force, moment, etc., which are imposed on respective parts, joints, and momentum of the robot. For example, as for the positions, velocity, acceleration, posture, angular velocity, and angular acceleration, the target values are set as values at a left side of the above Expression (9). The known force $f_k$ is stored separately.

A virtual external force calculating unit 13 obtains a virtual external force which is required to realize the target values set in the target value setting unit 12. Specifically, as for an unknown virtual external force, a force f which satisfies the above Expressions (12) and (13) is obtained by a linear complementary problem solver 13-2. The coefficient matrix $\Lambda^{-1}$ or bias vector c of the above Expression (12) is obtained using high-speed operation of operational space physical quantities (for example, refer to JP-A-2007-108955), in an operational space physical quantity calculating unit 13-1. Information on the mechanical model is utilized for calculation of the operational space physical quantities. In a case where a known virtual external force $f_k$ is further added, a virtual external force which is required as a whole is obtained by Expression (14).

An actual force converting unit 15 converts the virtual external force $\tau_v = J^T f_v$, which is obtained in the virtual external force calculating unit 13, into actual forces, i.e., the external force $f_e$ obtained from an environment, and the torque $\tau_a$ of an actuator of a joint part so that the above Expression (16) may be satisfied. Conversion processing from the virtual external force into the actual forces is achieved by solving the above Expressions (19) and (20) by a secondary programming problem solver 15-1. Among them, the actual force converting unit 15 outputs the torque $\tau_a$ of an actuator.

A torque detection means 16 is a torque sensor (refer to FIG. 4A) attached to a joint part, and measures and outputs an actual torque which acts on each joint part. Also, a torque feedback control unit 17 detects the variation between the torque detected by the torque detection means 16, and a command torque, and feeds the variation back to an electrical current target value. As a result, disturbances, such as friction and inertia, which are included in a motor driving system, are suppressed, and an actuator target torque is precisely realized in each joint.

The invention has been described in detail hitherto, referring to specific embodiments. However, it is obvious that those skilled in the art can make modifications and substitutions of the embodiments without departing from the spirit of the present invention.

Although the embodiment in which the invention is applied to a bipedal walking legged mobile robot has been mainly described in this specification, the spirit of the present invention is not limited thereto. The invention can also be similarly applied to various types of mechatronics instruments including a multi-link structure which operates a joint actuator by the force control method.

In summary, the invention has been disclosed in an illustrative manner, and the contents described in this specification should not be definitely interpreted. In order to evaluate the spirit of the present invention, the claims should be taken into consideration.

In addition, the invention disclosed in the above embodiments is also taken as creation of designs, and the humanoid robot shown as FIGS. 1A to 1F is equivalent to a "robot toy" as described in the classification of articles comparable to Appendix 1 of Regulations under Design Law, and can also be the next aspects as description of the article related to the design.

An article related to the design is a humanoid robot whose action and thinking, for example, walking or the like is controlled independently, and can move fingers, hands, and feet, can move a neck, and can move a waist, similarly to a human being. Unlike a related-art industrial robot aiming at being provided for an industrial specific application, the article does not have such a particular industrial limited application. Additionally, the article is not a mere plaything unlike related-art toys or dolls. The principal features of the article, like an actual human being, are to interchange (communicate) intention, feeling, and thinking autonomously with a human being, to improve the life of a human being, and to support these. Whether or not the article is provided for any kinds of applications or objects is dependent on those who use this article. For example, the article can also be used mainly for a pet as a child's playmate, or can be provided for the purpose of nursing of a sick person, and can also substitute for a human being' task in an adverse environment. In this meaning, the article differs from a related-art article which is defined by specifying its application and function.

Additionally, the head part of the robot shown as FIGS. 1G to 1L is also taken as a replaceable part which constitutes a "robot toy" as described in the classification of articles comparable to Appendix 1 of Regulations under Design Law, and is equivalent to "a head part for the robot toy." Since the article related to the design has an application as a "robot toy" and the description thereof is common to the contents described in the above Paragraph 0129 except for functional description that the head part of the article is replaceable, the description of the article will be omitted.

Here, inventions of designs in a case where the invention disclosed in the above embodiments are also taken as creation of designs are described additionally. However, since FIG. 1B is a left side view, and a right side view is represented substantially symmetrically, illustration of the right side view is omitted. Similarly, since a right side view is represented substantially symmetrically to FIG. 1H, illustration thereof is omitted.

Additionally, the invention disclosed in the above embodiment shall be taken as partial designs from FIGS. 1A to 1L. Here, although not shown, the article related to the design is used as a "robot toy", and as partial designs related to the "robot toy", it can be inferred that the present applicant intends to receive design registration of the parts shown in FIGS. 1G to 1L as partial designs, and portions, other than the portions which are intended to receive design registrations as the partial designs can be inferred by subtracting FIGS. 1G through 1L among FIGS. 1A to 1F.

The present application contains subject matter related to that disclosed in Japanese Priority Patent Application JP 2008-119508 filed in the Japan Patent Office on May 1, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An actuator control device for force-controlling a joint driving actuator according to a commanded joint force command value $\tau_a$, the actuator control device comprising:
   means for detecting a joint value q at an output stage of the actuator;
   means for detecting an action force $\tau_e$ in a joint driving direction at the output stage of the actuator;
   means for determining an instructed driving force $\tau$ to the actuator, on the basis of an ideal response model of the actuator which specifies the relationship of a joint value acceleration target value achieved as the actuator responds ideally when a joint force command value $\tau_a$, the action force $\tau_e$, and a joint value velocity obtained by time-differentiating the joint value q are given;
   wherein the means for determining an instructed driving force applies a disturbance observer to determine the driving force $\tau$ of the actuator;
   wherein the disturbance observer estimates a driving force which has acted on the joint on the basis of the joint value velocity obtained by time-differentiating the joint value q detected by the means for detecting a joint value q when the joint actuator is driven by the driving force $\tau$ determined by the means for determining an instructed driving force, and subtracts the estimated driving force from the driving force $\tau$ to calculate a disturbance joint force $\tau_d$; and
   a low pass filter is used to prevent the divergence of the system.

2. The actuator control device according to claim 1, wherein the ideal response model of the actuator includes an virtual inertia or an virtual viscous resistance coefficient $\upsilon_a$ which acts according to the magnitude of the joint value velocity obtained by time-differentiating the joint value q.

3. The actuator control device according to claim 1, wherein the driving force determining means corrects a joint force target value $\tau^{ref}$, which is based on the joint value acceleration target value obtained from the ideal response model, by the disturbance joint force $\tau_d$ obtained by the disturbance observer in a previous control cycle, and determines the instructed driving force $\tau$ in a current control cycle.

4. An actuator control method for force-controlling a joint driving actuator according to a commanded joint force command value $\tau_a$, the method comprising the steps of:
   obtaining a joint value q using an encoder at an output stage of the actuator;
   obtaining an action force $\tau_e$ using a torque sensor in a joint driving direction at the output stage of the actuator;
   determining an instructed driving force $\tau$ using a computer to the actuator, on the basis of an ideal response model of the actuator which specifies the relationship of a joint value acceleration target value achieved as the actuator responds ideally when a joint force command value $\tau_a$, the action force $\tau_e$, and a joint value velocity obtained by time-differentiating the joint value q are given;
   wherein a disturbance observer is applied to determine the driving force $\tau$ of the actuator in the driving force determining step;
   wherein the disturbance observer estimates a driving force which has acted on the joint on the basis of the joint value velocity obtained by time-differentiating the joint value q obtained in the joint value obtaining step when the joint actuator is driven by the driving force $\tau$ determined in the driving force determining step, and subtracts the estimated driving force from the driving force $\tau$ to calculate a disturbance joint force $\tau_d$; and
   a low pass filter is used to prevent the divergence of the system.

5. The actuator control method according to claim 4, wherein the ideal response model of the actuator includes an virtual inertia or an virtual viscous resistance coefficient $\upsilon_a$ which acts according to the magnitude of the joint value velocity obtained by time-differentiating the joint value q.

6. The actuator control device according to claim 4, wherein, in the driving force determining step, a joint force target value $\tau^{ref}$, which is based on the joint value acceleration target value obtained from the ideal response model, is corrected by the disturbance joint force $\tau_d$ obtained by the disturbance observer in a previous control cycle, and the instructed driving force $\tau$ in a current control cycle is determined.

7. An actuator comprising:
   a motor which generates a rotary torque;
   a motor driver which drives the motor;
   a reducer which converts a rotary force of the motor into a sufficient generation force;
   an encoder which measures a joint angle q at an output shaft of the reducer;
   a torque sensor which detects an external torque $\tau_e$ of the motor at the output shaft of a reducer; and a control unit which determines an instructed torque $\tau$ on the basis of an ideal response model of the actuator which specifies the relationship of a joint value acceleration target value achieved as the actuator responds ideally when a torque command value $\tau_a$, the external torque $\tau_e$, and a joint value velocity obtained by time-differentiating the joint value q are given, and which converts and outputs the determined torque into a control signal for a motor driver;
   wherein the control unit includes a disturbance observer estimates a torque, which has acted on the joint based on a joint angular velocity obtained by time-differentiating the joint angle q detected by the encoder, when the actuator is driven by the joint torque $\tau$, and subtracts the estimated torque from the instructed torque $\tau$ to calculate a disturbance torque $\tau_d$, and corrects a joint force target value $\tau^{ref}$, which is based on the joint value acceleration target value obtained from the ideal response model, by the disturbance joint force $\tau_d$ obtained by the disturbance observer in a previous control cycle, and determines the instructed driving force $\tau$ in a current control cycle; and
   a low pass filter is used to prevent the divergence of the system.

8. The actuator according to claim 7,
   wherein the ideal response model includes an virtual inertia or an virtual viscous resistance coefficient $\upsilon_a$ which acts according to the magnitude of the joint angular velocity obtained by time-differentiating the joint value q measured by the encoder.

9. A robot apparatus comprising a link structure constructed by connecting a plurality of rigid body links, and joint actuators which drive joints which connect between the links, and at least some joint actuators are constituted by the actuators according to claim 7.

10. An actuator control device for force-controlling a joint driving actuator according to a commanded joint force command value $\tau_a$, the actuator control device comprising:
- a joint value detector detecting a joint value q using an encoder at an output stage of the actuator;
- an action force detector using a torque sensor configured to detect an action force $\tau_e$ in a joint driving direction at the output stage of the actuator;
- a driving force determining unit using a computer configured to determine an instructed driving force $\tau$ to the actuator, on the basis of an ideal response model of the actuator which specifies the relationship of a joint value acceleration target value achieved as the actuator responds ideally when a joint force command value $\tau_a$, the action force $\tau_e$, and a joint value velocity obtained by time-differentiating the joint value q are given;
- wherein a disturbance observer is applied to determine the driving force $\tau$ of the actuator in the driving force determining step;
- wherein the disturbance observer estimates a driving force which has acted on the joint on the basis of the joint value velocity obtained by time-differentiating the joint value q obtained in the joint value obtaining step when the joint actuator is driven by the driving force $\tau$ determined in the driving force determining step, and subtracts the estimated driving force from the driving force $\tau$ to calculate a disturbance joint force $\tau_d$; and
- a low pass filter is used to prevent the divergence of the system.

* * * * *